United States Patent [19]
Rooney

[11] Patent Number: 6,165,432
[45] Date of Patent: Dec. 26, 2000

[54] COMPOSITION AND PROCESS FOR REMOVAL OF ACID GASES

[75] Inventor: Peter C. Rooney, Lake Jackson, Tex.

[73] Assignee: The Dow Chemical Company, Midland, Mich.

[21] Appl. No.: 09/164,140

[22] Filed: Sep. 30, 1998

[51] Int. Cl.$^7$ ............ C01B 17/00; C01B 17/16; C01B 31/20; C09K 3/00

[52] U.S. Cl. ............ 423/228; 423/229; 252/189; 252/190; 252/182.11

[58] Field of Search .................... 252/189, 190, 252/182.11; 423/226, 228, 229

[56] References Cited

U.S. PATENT DOCUMENTS

| | | | |
|---|---|---|---|
| 4,100,257 | 7/1978 | Sartori et al. | 423/226 |
| 4,101,633 | 7/1978 | Sartori et al. | 423/228 |
| 4,112,050 | 9/1978 | Sartori et al. | 423/223 |
| 4,217,236 | 8/1980 | Sartori et al. | 252/189 |
| 4,240,922 | 12/1980 | Sartori et al. | 252/189 |
| 4,336,233 | 6/1982 | Appl et al. | 423/228 |
| 4,405,583 | 9/1983 | Stognyn et al. | 423/228 |
| 4,417,075 | 11/1983 | Stognyn | 564/505 |
| 4,471,138 | 9/1984 | Stogryn | 564/508 |
| 4,551,158 | 11/1985 | Wagner et al. | 55/46 |
| 4,814,104 | 3/1989 | Kubek et al. | 252/189 |
| 4,997,630 | 3/1991 | Wagner et al. | 423/228 |
| 4,999,031 | 3/1991 | Gerhardt et al. | 55/43 |
| 5,209,914 | 5/1993 | Peytavy et al. | 423/228 |
| 5,277,885 | 1/1994 | Peytavy et al. | 423/228 |
| 5,366,709 | 11/1994 | Peytavy et al. | 423/228 |
| 5,508,012 | 4/1996 | Trauffer | 423/206.1 |
| 5,556,606 | 9/1996 | Khanmamedov | 423/228 |
| 5,618,506 | 4/1997 | Suzuki et al. | 423/228 |
| 5,688,478 | 11/1997 | Pounds et al. | 423/228 |
| 5,700,438 | 12/1997 | Miller | 423/220 |
| 5,861,051 | 1/1999 | Critchfield et al. | 95/172 |

FOREIGN PATENT DOCUMENTS

| | | |
|---|---|---|
| 1091429 | 12/1980 | Canada . |
| 0 160 203 A1 | 3/1985 | European Pat. Off. ........ B02D 53/14 |

OTHER PUBLICATIONS

A. Kohl and R. Nielsen, *Gas Purification*, 5$^{th}$ edition, Gulf Publishing, (1997).
A. Kohl and F.C. Riesenfeld, *Gas Purification*, 4$^{th}$ edition, Gulf Publishing, (1985).
A. Kohl, F.C. Riesenfeld, *Gas Purification*, 3$^{rd}$ edition, Gulf Publishing, (1979).
Dow, *The Gas Conditioning Fact Book*, (1962).
M S. Dupart, T.R. Bacon, and D. J. Edwards, *Hydrocarbon Processing*, "Understanding corrosion in alkanolamine gas treating plants", Apr./May, Part One and Two, (1993).
Y. Tomoe, M. Tezuka, K. Shimizu, and K. Kibayashi, Proceedings of the First Mexican Symposium on Metallic Corrosion, "Corrosion of Iron and Steel in Carbon Dioxide–Alkanolamine Solution", Mar. 7–11, Merida, MX, (1994).
L.G. Harruff, 1998 Laurance Reid Gas Conditioning Conference Proceedings, "Saudi Arabian Experience with DGA Units and Related Sulfur Plants", pp. 76–98, (1998).
C J. Kim, *Industrial Eng. Chem. Res.*, "Degradation of Alkanolamines in Gas–Treating Solutions: Kinetics of Di–2 propanolamine Degradation in Aqueous Solutions Containing Carbon Dioxide", vol. 27, pp. 1–3, (1988).
O. F. Dawodu and A. Meisen, *Chem. Eng. Comm.*, Effects of Composition on the Performance of Alkanolamine Blends For Gas Sweetening, vol. 144, pp. 103–112, (1996).
P. E. Holub, J.E. Critchfield, and W. Su, 48$^{th}$ Annual Laurance Reid Gas Conditioning Conference, "Amine Degradation Chemistry in CO$_2$ Service", Norman, OK, Mar. 1–4, pp. 146–160, (1998).

*Primary Examiner*—Joseph D. Anthony

[57] ABSTRACT

Aqueous compositions comprising a mixture of a tertiary alkanolamine and a primary alkanolamine of the formula $$R\text{—}CH(NH_2)\text{—}CH_2\text{—}OH \qquad (I)$$

or mixtures thereof wherein R is H, or an alkyl group having from 1 to 8 are effective in the removal of acidic gases from a fluid stream containing same and show superior degradation properties as well as unexpectedly low degradation, corrosivity and metals solubility properties.

26 Claims, No Drawings

COMPOSITION AND PROCESS FOR REMOVAL OF ACID GASES

This invention relates to a composition and method for removing acid gases such as, for example, $H_2S$, $CO_2$ and COS from a fluid stream containing same.

BACKGROUND OF THE INVENTION

Purification of fluids involves removal of impurities from fluid steams. Various fluid purification methods are known and practiced. These fluid purification methods generally fall in one of the following categories: absorption into a liquid, adsorption on a solid, permeation through a membrane, chemical conversion to another compound, and condensation. The absorption purification method involves the transfer of a component of a fluid to a liquid absorbent in which said component is soluble. If desired, the liquid containing the transferred component is subsequently stripped to regenerate the liquid. See, for example, A. Kohl and R. Nielsen, "Gas Purification, $5^{th}$ edition, Gulf Publishing, 1997; A. Kohl and F. C. Riesenfeld "Gas Purification, $4^{th}$ edition, Gulf Publishing, 1985; A. Kohl and F. C. Riesenfeld "Gas Purification, 3rd edition, Gulf Publishing, 1979; and "The Gas Conditioning Fact Book" published by The Dow Chemical of Canada, Limited, 1962; all incorporated herein by reference.

Aqueous solutions of various primary, secondary and tertiary alkanolamines, such as, for example, monoethanolamine(MEA), diethanolamine (DEA), diglycolamine (DGA),diisopropanolamine (DIPA), methyldiethanolamine (MDEA) and triethanolamine (TEA), have been used as absorbent liquids to remove acid gases from liquid and gas streams. In a regeneration method, the aqueous alkanolamine solution containing acid gas is then subjected to heat to regenerate the aqueous alkanolamine solution.

Primary alkanolamines such as MEA and DGA, or secondary alkanolamines such as DEA or DIPA are generally suitable for highly exhaustive removal of $CO_2$. However they have the disadvantage of requiring a large expenditure of energy for regeneration. Corrosion is also a major concern when using these alkanolamines (especially primary alkanolamines, that is, MEA and DGA) for gas treating applications.

DuPart et al., Hydrocarbon Processing, Parts 1 and 2 March/April 1993, examine the corrosivity of various alkanolamines. They show that the order of corrosivity to carbon steel is MEA>DEA>MDEA.

Tomoe et al., Proceedings of the First Mexican Symposium on Metallic Corrosion, 1994, March 7–11, Merida, Yucatan Mexico, report that after one year of operation with 65 percent by weight DGA the carbon steel and even austinitic stainless steel of the plant was found to be vigorously attacked.

Harruff, L. G., Proceedings of The 1998 Gas Conditioning Conference, Norman, OK, March 1–4, pp. 76–98, also report violent foaming for a plant using DGA. In this particular case, addition of large carbon filter beds in combination with a thermal reclaimer were required to improve operations.

It is also known that aqueous solutions containing about 20 percent by weight MEA or more, due to the corrosivity to carbon steel, often require addition of toxic heavy metals (that is, for example arsenic, antimony or vanadium) to control plant corrosion to acceptable levels.

Another disadvantage of using primary and secondary alkanolamines such as MEA, DEA and DIPA is that $CO_2$ reacts with these alkanolamines to form degradation compounds such as ureas, oxazolidinones and ethylenediamines.

C. J. Kim, Ind. Eng. Chem. Res. 1988, 27, and references cited therein shows how DEA reacts with $CO_2$ to form 3-(2-hydroxyethyl)-2-oxazolidinone (HEO), and N,N,N'-tris (2-hydroxyethyl)ethylenediamine (THEED). This reference also shows how DIPA reacts to form 3-(2-hydroxypropyl)-5-methyl-2-oxazolidinone (HPMO). These degradation compounds reduce the amount of alkanolamine available for acid gas pick up, increase the viscosity of the solution, and potentially increase the corrosivity of the solvent.

Tertiary alkanolamines, especially MDEA and TEA, require less energy consumption for regeneration, but since they do not react directly with $CO_2$, they normally leave from as low as few thousand part per million (ppm) of $CO_2$ to as much as a few percent $CO_2$ in the treated fluid stream. Tertiary alkanolamines are, however, suitable for selective removal of $H_2S$ from a fluid containing both $H_2S$ and $CO_2$, since the absorption rate for $H_2S$ is about the same for all alkanolamines.

It is well known that primary or secondary alkanolamines activators can be used in combination with tertiary alkanolamines to remove $CO_2$ from fluid streams down to as low as 100 ppm or less requiring less regeneration energy than is required by using the primary or secondary alkanolamines alone.

Dawodu and Meisen, Chem. Eng. Comm., 1996, 144, p. 103, demonstrate, however, that mixtures of MDEA with a primary alkanolamine (MEA) are harder to strip than mixtures of MDEA with secondary alkanolamine (DEA or DIPA).

Holub et al., Proceedings of The 1998 Gas Conditioning Conference, Norman, Okla., March 1–4, pp. 146–160, discloses that MEA corrosion in plants coupled with the higher component vapor pressure of MEA reduces the practicality of using MEA as a formulating agent (see, page 147, paragraph 4). For this reason, up to now, blends of MDEA and secondary alkanolamines are used almost exclusively to increase capacity and reduce corrosion concerns rather than aqueous solutions of primary or secondary alkanolamines alone.

U.S. Pat. Nos. 5,209,914 and 5,366,709 shows how secondary alkanolamine activators such as ethylmonoethanolamine (EMEA) or butylmonoethanolamine (BMEA) can be used with MDEA to afford better $CO_2$ removal than MDEA alone. However, the aforementioned Holub et al. reference discloses laboratory and plant data showing that secondary alkanolamines methylmonoethanolamine (MMEA) and DEA have very high rates of degradation which leads to corrosion and loss of capacity (see, page 154, paragraphs 1 and 2). The Holub reference further discloses data of MDEA blends formulated with an additive that is neither a primary nor secondary alkanolamine (see, page 151, paragraphs 2 and 3) that reduces the aforementioned disadvantages of formulating blends of primary and secondary alkanolamines and MDEA for gas treating applications. No data on additive solubility or corrosivity was given for comparison.

U.S. Pat. No. 4,336,233 discloses that the use of a combination of piperazine (a secondary amine) and MDEA results in an improved acid gas removal. However, one particular disadvantage of piperazine is that piperazine carbamate formed from the reaction of piperazine and $CO_2$ is not soluble in the aqueous MDEA/piperazine solution. Thus, the additive level is limited up to about only 0.8 moles/liter, which severely limits the capacity of the solvent, or requires higher circulation rates to treat the same amount of fluid than other MDEA/alkanolamine activator blends require.

Canadian Patent No. 1,091,429 (G. Sartori et al) describes the use of aqueous solutions containing water-soluble primary monoamines having a secondary carbon atom attached to the amino group in gas purification applications. Primary monoamines having a secondary carbon atom attached to the amino group specifically mentioned in this reference as being suitable are 2-amino-1-propanol, 2-amino-1-butanol, 2-amino-3-methyl-1-butanol, 2-amino-1-pentanol, 2-amino-1-hexanol and 2-aminocyclohexanol. However, this reference does not provide degradation, metals solubility (that is, Fe, Ni and Cr solubility) or corrosion data for MEA compared to the primary monoamines having a secondary carbon atom attached to the amino group that might suggest that these primary monoamines are a commercially viable option as a replacement for MEA. This, combined with the high cost of the primary monoamines having a secondary carbon atom attached to the amino group, are the most likely reasons that there are no known gas treating plants using these primary amines solutions as alternatives to MEA. Furthermore, this reference neither teaches nor even suggests that the aqueous blends of the primary monoamines having a secondary carbon atom attached to the amino group such as, for example, 2-amino-1-butanol (2-AB) and MDEA or other tertiary alkanolamines will have unexpectedly low degradation, corrosivity and metals solubility compared to other MDEA blends known in the art.

Chem. Eng. Comm., 1996, Vol. 144, pp. 103–112, "Effects of Composition on the Performance of Alkanolamine blends for Gas Sweetening", describes the influence of blend composition and components on some of the parameters which can be used to monitor the performance of amine blends for aqueous blends of MDEA and MEA, MDEA and DEA, and MDEA and DIPA.

48th Annual Laurance Reid Gas Conditioning Conference, March 1–4, 1998, pp. 146–160, "Amine Degradation Chemistry in $CO_2$ Service", describes the degradation chemistry of various ethanolamines in $CO_2$ service. The paper promotes gas treating solvents which are not formulated with primary or secondary ethanolamines as a solution for the loss rates associated with the use of various ethanolamines such as MDEA, MMEA and DEA.

It is evident that there is still a great need and interest in the gas purification industry for alkanolamine compositions which are aqueous blends of a primary and tertiary alkanolamine which will be effective in the removal of acidic gases from fluid streams and will have low degradation, corrosivity and metals solubility properties compared to alkanolamine blends known in the art.

It has now been discovered that an aqueous mixture comprising a tertiary alkanolamine and a primary alkanolamine having a secondary carbon atom attached to the amino group is not only effective in removing acidic gases from fluid stream but it also has unexpectedly low degradation, corrosivity and metals solubility properties.

In the context of the present invention the term "fluid stream" encompasses both a gaseous stream and liquid stream.

SUMMARY OF THE INVENTION

In one aspect the present invention is an aqueous composition adapted for use in the removal of acidic gases from a fluid stream containing same, said aqueous composition comprising a mixture of a tertiary alkanolamine and a primary alkanolamine of the formula $$R\text{—}CH(NH_2)\text{—}CH_2\text{—}OH \quad (I)$$

or mixtures thereof wherein R is H, or an alkyl group having from 1 to 8, preferably from 1 to 6, more preferably from 2 to 4, carbon atoms.

In another aspect the present invention is a process for removing acidic gases from a fluid stream containing same, said process comprising contacting said fluid stream containing acidic gases with an aqueous composition comprising a mixture of a tertiary alkanolamine and a primary alkanolamine of the formula $$R\text{—}CH(NH_2)\text{—}CH_2\text{—}OH \quad (I)$$

or mixtures thereof wherein R is H, or an alkyl group having from 1 to 8, preferably from 1 to 6, more preferably from 2 to 4, carbon atoms.

DETAILED DESCRIPTION OF THE INVENTION

The aqueous mixtures of alkanolamines of the present invention are surprisingly found to be effective for removing acidic gases, particularly $CO_2$, $H_2S$, COS or mixtures thereof, from a fluid stream containing same and yet exhibit unexpectedly low degradation, corrosivity and metals solubility properties.

The alkyl group having from 1 to 8 carbon atoms contemplated by R in formula I can be straight or branched chain alkyl group. Non-limiting examples of such alkyl groups are methyl, ethyl, propyl, isopropyl, butyl, isobutyl, pentyl, hexyl, heptyl, and octyl.

Non-limiting examples of the primary alkanolamines of formula I suitable for the practice of the present invention include 2-amino-1-butanol, 2-aminopropanol, 2-amino-3-methyl-1-butanol, 2-amino-1-pentanol, 2-amino-1-hexanol and 2-amino-1-octanol. 2-Amino-1-butanol (2-AB) is the most preferred primary alkanolamine of formula I.

Any known tertiary alkanolamine is suitable for use in combination with the primary alkanolamines of formula I in the practice of the present invention. Non-limiting examples of suitable tertiary alkanolamines include methyldiethanolamine (MDEA), dimethylethanolamine (DMEA) and triethanolamine (TEA).

The tertiary alkanolamine and primary alkanolamine of formula I are present in the aqueous composition of the present invention in an amount effective to remove acidic gases from a fluid stream.

The primary alkanolamine of formula I is typically present in an amount of from about 1 to about 30, preferably from about 5 to about 20, more preferably from about 7 to about 15, percent by weight based on the total weight of the aqueous mixture.

The tertiary alkanolamine is generally used in an amount of from about 20 to about 50, preferably from about 25 to about 40, more preferably from about 30 to about 40, percent by weight based on the total weight of the aqueous mixture.

The optimal amount of the tertiary alkanolamine and primary alkanolamine of formula I will depend on the fluid stream composition, outlet fluid requirement, circulation rate, and energy available for stripping the solvent. A person of ordinary skill in the art would readily determine the optimal amount of each of the tertiary alkanolamine and primary alkanolamine of formula I.

The process of the present invention can be carried out in any conventional equipment for the removal of acidic gases from fluids and detailed procedures are well known to a person of ordinary skill in the art. See, for example, U.S. Pat. No. 1,783,901 (Bottoms) and subsequent improvements which are known in the art.

The process according to the present invention can be conveniently carried out in any suitable absorber. The great number of absorbers used for gas purification operations include packed, plate, or spray towers. These absorbers are interchangeable to a considerable extent although certain specific conditions may favor one over the other. In addition to conventional packed, plate, or spray towers, specialized absorber towers have been developed to meet specific process requirements. Examples of these specific towers include impingement-plate scrubbers and turbulent contact scrubbers. The process of the present invention can be carried out in either packed, plate, or spray towers, and can contain other peripheral equipment as necessary for optimal process operation. Such peripheral equipment may include an inlet gas separator, a treated gas coalescor, a solvent flash tank, a particulate filter and a carbon bed purifier. The inlet gas flow rate vary depending on the size of the equipment but is typically between 5 and 100 million standard cubic feet per day (SCFD). The solvent circulation rate will depend on the amine concentration, the gas flow rate, gas composition, total pressure and treated fluid specification. The solvent circulation rate is typically between 5 and 5000 gallons per minute (gpm). Pressure inside the absorber can vary between 0 and 1200 psig depending on the type of fluid being processed.

The absorbers, strippers and peripheral equipment useful for carrying out the process of the present invention are well known in the art and are described in many publications including the aforementioned references.

In the process of the present invention, a fluid containing an acid gas is contacted with an aqueous mixture comprising a tertiary alkanolamine and primary alkanolamine of formula I at a temperature of from about ambient temperature (approximately 25° C., 77° F.) up to about 93° C. (200° F.).

Temperatures inside the stripper tower, if one is employed, can vary between about 82° C. (180° F.) and about 127° C. (260° F.). The stripper overhead pressure is typically between 0 and about 20 psig. Optionally, corrosion inhibitors, scale inhibitors and antifoam agents may be employed.

The following examples are offered to illustrate but not limit the invention. Percentages, ratios and parts are by weight unless stated otherwise.

EXAMPLE 1 AND COMPARATIVE EXAMPLES C-1 TO C-5

Autoclave corrosivity and Fe solubility tests were performed at about 121° C. (250° F.) for six days by stirring aqueous solutions (1000 grams) of each of DGA (5 moles), MEA (5 moles), 2-AB (5 moles), mixture of MDEA (2.5 moles) with DGA (2.5 moles), mixture of MDEA (2.5 moles) with MEA (2.5 moles), and mixture of MDEA (2.5 moles) with 2-AB (2.5 moles) which were saturated at room temperature with $CO_2$. In each autoclave was placed a custom rack containing a carbon steel coupon so that it allowed the coupon to be fully submersed into the liquid. Each coupon was weighed before it was placed in the autoclave. After six days submersion in the liquid, each coupon was cleaned and weighed again. The weight loss of the coupon was attributed to the corrosivity of the liquid into which the coupon was submersed. The results are given in Table 1 below.

TABLE 1

| Example | Aqueous Solution | wt % $CO_2$ | Fe Solubility (ppm) | Corrosivity (mils per year) |
|---|---|---|---|---|
| C-1 | 2-AB | 11.64 | 163 | 33 |
| C-2 | MEA | 11.84 | 190 | 216 |
| C-3 | DGA | 12.10 | 373 | 211 |
| C-4 | MDEA + DGA | 10.74 | 288 | 12 |
| C-5 | MDEA + MEA | 10.89 | 185 | 22 |
| 1 | MDEA + 2-AB | 10.96 | 57 | 20.5 |

As expected from known literature, data in Table 1 confirms high carbon steel corrosivity of primary alkanolamines commonly used for purifying fluid streams. It is also noted that severe pitting was detected on carbon steel coupon submersed in the DGA. However, 2-AB (a primary alkanolamine not conventionally used for fluid purifying applications) has surprisingly low carbon steel corrosivity which has not been described nor even suggested in Canadian Patent No. 1,091,429 nor expected based upon literature data showing the corrosivity of primary alkanolamines.

The carbon steel corrosivity of each of solutions comprising a mixture of MDEA with either DGA, MEA or 2-AB was considerably lower than that of the 2-AB, MEA or DGA solution. Moreover, the Fe solubility for the solution comprising a mixture of MDEA with 2-AB is surprisingly much lower than any other solution tested.

EXAMPLE 2 AND COMPARATIVE EXAMPLES C-6 and C-7

Autoclave tests were performed to determine metals solubility at about 121° C. (250° F.) for six days by stirring aqueous solutions (1000 grams) of each of mixture of MDEA (2.5 moles) with DGA (2.5 moles), mixture of MDEA (2.5 moles) with MEA (2.5 moles), and mixture of MDEA (2.5 moles) with 2-AB (2.5 moles) which were saturated at room temperature with $CO_2$. In each test in each autoclave was placed a custom rack containing a carbon steel, chromium or nickel coupon so that it allowed the coupon to be fully submersed into the liquid. After six days, each solution was analyzed by inductively coupled plasma (ICP) for metals solubility. The results are given in Table 2 below.

TABLE 2

| Example | Aqueous Solution | wt % $CO_2$ | Fe Solubility (ppm) | Cr Solubility (ppm) | Ni Solubility (ppm) |
|---|---|---|---|---|---|
| 2 | MDEA + 2-AB | 10.96 | 57 | 4.7 | 0.8 |
| C-6 | MDEA + MEA | 10.89 | 185 | 8.3 | 172 |
| C-7 | MDEA + DGA | 10.74 | 288 | 5.8 | 2.3 |

This data clearly shows the unexpected advantage of the aqueous composition of the present invention, that is, the solution comprising mixture of MDEA with 2-AB, over conventionally used mixtures of MDEA and either MEA or DGA.

EXAMPLE 3 AND COMPARATIVE EXAMPLES C-8 AND C-9

Autoclave degradation and corrosivity tests were performed on equimolar amine solutions using 0.050 mole of $CO_2$ per mole of amine at about 126.7° C. (260° F.). An aqueous solution (1100 ml.) containing MDEA (35 percent by weight) and either 2-AB (15 percent by weight), EMEA (15 percent by weight), or BMEA (15 percent by weight was added to a 2 liter Parr autoclave. Then each solution was loaded with $CO_2$ such that the $CO_2$ loading was about 0.050 mole of $CO_2$ per mole of total amine. The solution was then heated for 28 days at about 126.7° C. (260° F.). After 28 days, the solutions were analyzed by gas chromatography (GC) and gas chromatography/mass spectrometry (GC/MS) to determine the amount of the amine additive (primary or secondary) remaining in the solution and for the presence of degradation/conversion products. The amount of 2-AB (two runs), EMEA and BMEA in the solution after 28 days was 14.8 (average), 10.6 and 10.4 weight percent, respectively. This data shows that about 30 weight percent of EMEA and BMEA were lost to degradation in 28 days compared to less than 1.5 weight percent of 2-AB lost to degradation (about 0.2 weight percent of what is possibly an oxazolidinone or substituted ethylenediamine was detected by GC and GC/MS) over 28 days. EMEA converted to about 3 weight percent of N,N'-(2-hydroxyethyl)ethylenediamine. BMEA converted to about 3.2 weight percent of N,N'-dibutyl-N-(2-hydroxyethyl)ethylenediamine plus a small amount (less than 0.5 weight percent) of N-butyl-2-oxazolidinone. Carbon steel weight loss for each sample was less than 0.5 mils per year after 28 days. The results are given in Table 3 below.

TABLE 3

| Example | Aqueous Solution | Amine Additive Remaining after 28 Days | Degradation |
|---|---|---|---|
| 3 | MDEA + 2-AB (2 Runs1) | 14.81 wt % (average) | yes (<0.2%) |
| C-8 | MDEA + EMEA | 10.6 wt % | yes (~30%) |
| C-9 | MDEA + BMEA | 10.4 wt % | yes (~30%) |

This data shows the unexpected excellent stability of the primary alkanolamine (2-AB) of the present invention compared to the known secondary alkanolamines (EMEA and BMEA) while also having very low carbon steel corrosivity. The data demonstrates that substantially all of 2-AB remains in the solution after 28 days with essentially no detection of a degradation product while during the same time substantial amount of EMEA and BMEA has been lost due to their reactivity with $CO_2$ and conversion into undesirable reaction products.

What is claimed is:

1. A process for removing acidic gases from a fluid stream containing same, said process comprising contacting said fluid stream with an aqueous composition comprising a mixture of a tertiary alkanolamine and a primary alkanolamine of the formula

R—CH(NH$_2$)—CH$_2$—OH (I)

or mixtures thereof wherein R is H, or an alkyl group having from 1 to 8.

2. The process according to claim 1 wherein R in formula I is an alkyl group having from 1 to 6 carbon atoms.

3. The process according to claim 1 wherein R in formula I is an alkyl group having from 1 to 4 carbon atoms.

4. The process according to claim 1 wherein the primary alkanolamine of formula I is selected from the group consisting of 2-amino-1-butanol, 2-amino-propanol, 2-amino-3-methyl-1-butanol, 2-amino-1-pentanol, 2-amino-1-hexanol and 2-amino-1-octanol.

5. The process according to claim 1 wherein the primary alkanolamine of formula I is 2-amino-1-butanol.

6. The process according to claim 1 wherein the tertiary alkanolamine is selected from the group consisting of methyldiethanolamine, dimethylethanolamine and triethanolamine.

7. The process according to claim 6 wherein the tertiary alkanolamine is methyldiethanolamine.

8. The process according to any one of claims 1 to 7 wherein the primary alkanolamine of formula I is present in an amount of from about 1 to about 30 percent by weight.

9. The process according to any one of claims 1 to 7 wherein the primary alkanolamine of formula I is present in an amount of from about 5 to about 20 percent by weight.

10. The process according to any one of claims 1 to 7 wherein the primary alkanolamine of formula I is present in an amount of from about 7 to about 15 percent by weight.

11. The process according to any one of claims 1 to 7 wherein the tertiary alkanolamine is present in an amount of from about 20 to about 60 percent by weight.

12. The process according to any one of claims 1 to 7 wherein the tertiary alkanolamine is present in an amount of from about 25 to about 40 percent by weight.

13. The process according to any one of claims 1 to 7 wherein the tertiary alkanolamine is present in an amount of from about 30 to about 40 percent by weight.

14. An aqueous composition adapted for use in the removal of acidic gases from a fluid stream containing same, said aqueous composition comprising a mixture of a tertiary alkanolamine and a primary alkanolamine of the formula

R—CH(NH$_2$)—CH$_2$—OH (I)

or mixtures thereof wherein R is H, or an alkyl group having from 1 to 8.

15. The aqueous composition according to claim 14 wherein R in formula I is an alkyl group having from 1 to 6 carbon atoms.

16. The aqueous composition according to claim 14 wherein R in formula I is an alkyl group having from 1 to 4 carbon atoms.

17. The aqueous composition according to claim 14 wherein the primary alkanolamine of formula I is selected from the group consisting of 2-amino-1-butanol, 2-amino-propanol, 2-amino-3-methyl-1-butanol, 2-amino-1-pentanol, 2-amino-1-hexanol and 2-amino-1-octanol.

18. The aqueous composition according to claim 14 wherein the primary alkanolamine of formula I is 2-amino-1-butanol.

19. The aqueous composition according to claim 14 wherein the tertiary alkanolamine is selected from the group consisting of methyldiethanolamine, dimethylethanolamine and triethanolamine.

20. The aqueous composition according to claim 19 wherein the tertiary alkanolamine is methyldiethanolamine.

21. The aqueous composition according to any one of claims 14 to 20 wherein the primary alkanolamine of formula I is present in an amount of from about 1 to about 30 percent by weight.

22. The aqueous composition according to any one of claims 14 to 20 wherein the primary alkanolamine of formula I is present in an amount of from about 5 to about 20 percent by weight.

23. The aqueous composition according to any one of claims 14 to 20 wherein the primary alkanolamine of formula I is present in an amount of from about 7 to about 15 percent by weight.

24. The aqueous composition according to any one of claims 14 to 20 wherein the tertiary alkanolamine is present in an amount of from about 20 to about 60 percent by weight.

25. The aqueous composition according to any one of claims 14 to 20 wherein the tertiary alkanolamine is present in an amount of from about 25 to about 40 percent by weight.

26. The aqueous composition according to any one of claims 14 to 20 wherein the tertiary alkanolamine is present in an amount of from about 30 to about 40 percent by weight.

* * * * *